(12) United States Patent
Yamamoto et al.

(10) Patent No.: US 6,317,395 B1
(45) Date of Patent: Nov. 13, 2001

(54) OPTICAL DISC DEVICE FOR VARYING PLL CHARACTERISTIC AND SERVO CHARACTERISTIC BASED ON ACTUAL REPRODUCTION SPEED

(75) Inventors: Takeharu Yamamoto, Takatsuki; Katsuya Watanabe, Nara; Mitsurou Moriya; Takashi Kishimoto, both of Ikoma, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/217,831

(22) Filed: Dec. 22, 1998

(30) Foreign Application Priority Data

Dec. 22, 1997 (JP) .................................................. 9-351835

(51) Int. Cl.[7] ..................................................... G11B 7/00
(52) U.S. Cl. ..................................... 369/44.35; 369/44.29
(58) Field of Search ............................... 369/44.29, 44.35

(56) References Cited

U.S. PATENT DOCUMENTS

| | | | |
|---|---|---|---|
| 4,370,679 | * | 1/1983 | Ceshkovsky et al. ........... 369/111 X |
| 5,073,886 | * | 12/1991 | Sasaki et al. ........................... 369/60 |
| 5,592,465 | * | 1/1997 | Yamagami et al. ................. 369/48 X |
| 5,703,853 | * | 12/1997 | Horigome et al. .......... 369/124.11 X |
| 5,721,717 | * | 2/1998 | Obata et al. ................... 369/44.27 O |
| 5,745,469 | * | 4/1998 | Kim et al. ........................ 369/44.29 X |
| 5,754,507 | * | 5/1998 | Nishikata .......................... 369/44.29 |
| 5,886,963 | * | 3/1999 | Abe et al. ..................... 369/44.29 X |
| 5,974,009 | * | 10/1999 | Tamura et al. .................... 369/44.29 |
| 6,028,826 | * | 2/2000 | Yamamoto et al. .............. 369/44.32 |
| 6,101,157 | * | 8/2000 | Bradshaw et al. ................ 369/44.29 |
| 6,195,321 | * | 2/2001 | Takamine et al. ...................... 369/50 |
| 6,198,711 | * | 3/2001 | Fujita et al. ....................... 369/59.16 |

\* cited by examiner

*Primary Examiner*—Aristotelis M. Psitos
(74) *Attorney, Agent, or Firm*—Parkhurst & Wendel, L.L.P.

(57) ABSTRACT

The object of the present invention is to realize a stable control and a stable signal reproduction in an optical disc device. When a head unit (110) is shifted in a radial direction or a reproduction speed is varied, a reproduction speed is detected based on a radial position at which the head unit is located and the number of rotaions of a motor (111), and settings of a focusing gain, a tracking gain, an amplification factor of an equalizer circuit (130), a band-limited frequency, a loop gain of a PLL circuit (131) and a divide ratio are varied based on said reproduction speed. Further, an accurate detection of an out of focus operation can be executed by using either one signal of a reflected-light quantity, an RF signal amplitude and a drive of a focusing actuator, or combined signals thereof. Thereby, a stable control and signal reproduction can be provided.

3 Claims, 6 Drawing Sheets

RECORDED PORTION, TRACKING-OFF

NON-RECORDED PORTION, TRACKING-OFF

RECORDED PORTION, TRACKING-ON

NON-RECORDED PORTION, TRACKING-ON

OPTICAL DISC DEVICE FOR VARYING PLL CHARACTERISTIC AND SERVO CHARACTERISTIC BASED ON ACTUAL REPRODUCTION SPEED

FIELD OF THE INVENTION

The present invention relates to an optical disc device for reproducing signals recorded on an optical disc by using a light source such as a laser, and more particularly relates to varying the characteristics of reproduced signal reproduction, focus control and tracking control systems according to the reproduction speed and relates to the detection of an operation out of the focus control in an optical disc device which supports more than one kind of disc and reproduction speed.

BACKGROUND OF THE INVENTION

In recent years, optical reproducing devices for reproducing signals such as video information and data for computers stored on recording media were required to read the data at faster speed. Further, the devices are required to have a plurality of reproduction speeds for music playback and other features.

Hereinbelow, conventional optical recording and reproducing devices will be explained.

FIG. 7 shows a block diagram of a conventional optical reproduction device [such as disclosed in U.S. Pat. No. 6,028,826.] A light beam emitted from a light source 101 such as a semiconductor laser is formed into a collimated light beam through a collimator lens 102. Thereafter, the collimated light beam is reflected through a polarizing beam splitter 103, passes through a quarter-wavelength plate 104 and is focused through a convergent lens 105 on a disc 107 rotated by a motor 111. The light beam reflected from the disc 107 passes through the convergent lens 105, quarter-wavelength plate 104, polarizing beam splitter 103, condensing lens 108 and then is irradiated on a light detector 109. The convergent lens 105 is mounted on a movable portion of an actuator 106. The convergent lens 105 is adapted to shift perpendicularly to the disc surface by the flow of current through the focusing coil of the actuator 106 and to shift in the radial direction of the disc by the flow of current through the tracking coil of the actuator 106. In a head unit 110, there are mounted the convergent lens 105, actuator 106, quarter-wavelength plate 104, polarizing beam splitter 103, collimator lens 102, light source 101, condensing lens 108 and light detector 109.

The output of the light detector 109 passes through amplifiers 114a–114d and then is input to a focus error circuit 115. The focus error circuit 115 processes the output signals from the amplifiers 114a–114d and outputs a focus error signal corresponding to the vertical displacement of the focal point of the light beam from the information-recording surface of the disc. The focus error signal is applied to the focusing coil of the actuator 106 via a variable amplifier 116, a phase compensator 117 for phase compensation, a switch 118 for the on-off control of focus control by the controller 150 and a driving circuit 119 for the amplification of power. Thereby, a control is performed such that the focal point of the light beam may be positioned on the information-recording surface.

Also, the output signal of the light detector 109 inputs to a tracking error circuit 120 through amplifiers 114a–114d. The tracking error circuit 120 outputs a tracking error signal corresponding to the positional displacement of the focal point of the light beam from a track. The tracking error signal is applied to the tracking coil of the actuator 106 through a variable amplifier 121, a phase compensator 122 for phase compensation, a switch 123 for the on-off control of the tracking control by the controller 150, and a driving circuit 124 for the amplification of power. Thereby, the convergent lens 105 is controlled such that the focal point of the light beam may be positioned on the track.

Further, the output signal of the light detector 109 is input via an adder 126 to an equalizer circuit 130, which functions as an amplifier and a frequency band limiter in identified frequency bands. The equalizer circuit 130 reproduces a RF (Radio Frequency) signal. The reproduced RF signals are input to a PLL (Phase Locked Loop) circuit 131, which produces a clock used as a reference in the reproduction process for signals. The PLL circuit 131 provides a reference clock synchronized with the RF signals.

FIG. 2 shows a block diagram of the PLL circuit 131.

A binarization circuit 301 binarizes the RF signal input to the PLL circuit 131 and outputs an RF binary signal DT. Also, a phase comparator 302 compares the phase of the RF binary signal with that of a lead clock and outputs a signal corresponding to the phase difference obtained. The output signal is amplified by an amplifier 303 and corrected for phase by a phase corrector 304 and input to a variable oscillator 305. The variable oscillator 305 makes its oscillation frequency vary according to an input signal and outputs an oscillation signal. The oscillation signal is input to a frequency divider 306. The frequency divider 306 divides the frequency of the oscillation signal according to a specified divide ratio and outputs the divided signal as a lead clock CK.

Further, the output signal of the light detector 109 is applied to a reflected-light-quantity detector 127, which outputs a signal responsive to the light quantity of the reflected light incident on the light detector 109.

A driving circuit 112 is intended to drive a disc motor 111 based on the output of the controller 150. The controller 150 controls the number of rotations of the disc motor 111 to be a predetermined number.

For example, in a device configured for reproducing compact discs (CD) at multiple reproduction speeds such as a standard, two-times, and six-times speeds, the settings of the focus control, tracking control, optimum gain of the PLL circuit, phase compensation characteristic and divide ratio are different at each reproduction speed, respectively.

For the reasons described above, conventional devices have performed the signal processing as follows.

When a reproduction speed is changed, the controller 150 sends to the driving circuit 112 a command for setting the number of rotations of the motor 111 to be a predetermined number. Also, the controller 150 provides signals to the variable amplifiers 116 and 121, PLL circuit 131 and equalizer circuit 130 for setting them to the characteristics (i.e. frequency or filter) corresponding to the reproduction speed.

Further, when the focus control is lost due to surface flaws on the disc and vibrations of the device, the abnormal driving sometimes damages the actuator 106. For this problem, conventional systems have used exclusively the reflected-light quantity detector 127 for detecting an improper operation out of focus control and switched off the focus control.

The conventional devices described above have the following problems. At first, in the reproduction method using CAV in which the motor rotates at a constant rate at all times, the (frequency) characteristic of the signal processing system is not varied depending on a position in the radial direction of the disc. Since the reproduction speed is different depending on the radial position during CAV reproduction, the optimum characteristic of the signal processing system also becomes different on the radial position. Therefore, there has been a problem that the quality of reproduced signals is sometimes too wrong to make reproducing operation impossible in some radial position.

Secondly, in the CAV reproduction method in which the number of rotations of the motor 111 is controlled depending on the reproduction position of the disc so as to maintain the reproduction speed constant, the frequency characteristic of the signal processing system is not varied during reproducing. When the heat unit 110 is quickly sent from an inner circumference to an outer circumference or vice versa to restart reproduction, the rotational change of the motor 111 sometimes cannot follow such a quick change. As a result, the reproduction is performed at a different speed from the predetermined reproduction speed. Therefore, there has been a problem that the difference from the predetermined reproduction speed is sometimes too large to make reproduction operation impossible.

Thirdly, in the method in which reproduction speed is varied, all characteristics of the signal processing, focus control and tracking control systems have been varied at the same time on setting a target rotation of the motor. However, the motor cannot actually respond quickly to such change, and there has been a problem that, during the transition, the reproduction speed is so different from an optimum characteristic that reproduction is impossible.

Fourthly, because the operation out of focus control has been detected exclusively by the reflected-light quantity detector, the characteristics of AS (an output level of reflected-light-quantity detector 127) varies broadly with respect to the focal point due to stray light and so on. And further, for discs with low reflectivity such as CD-RW, the S/N ratio is so small that problems of improper detection and non-detection have existed.

For overcoming the problems described above, the present invention is directed to provide a stable control and a stable reproduction performance, by varying the characteristic of the control system to the suitable characteristic responsive to the reproduction speed. Further, the present invention is directed to select the signal for detecting an operation out of focus control from three kinds of signals responding to the conditions of the disc to be reproduced and the device, and to thereby realize a stable and high speed detection of an operation out of focus control. Therefore, the collision of a convergent lens to discs causing flaws on the discs and fractures of actuator can be prevented.

DISCLOSURE OF THE INVENTION

To overcome the problems described above, a first optical disc device in accordance with the present invention varies the characteristic of a signal processing device according to the position of a light beam shifted across a track by a shift means moving.

A second optical disc device in accordance with the present invention varies the characteristic of a clock signal output device according to the position of a light beam shifted across a track by moving of a shift device.

A third optical disc device in accordance with the present invention varies (the gain or frequency) characteristic of a focus control device/a tracking control device based on the detected value of a reproduction speed detection device on varying the reproduction speed from a first to a second reproduction speed.

A fourth optical disc device in accordance with the present invention varies the gain or frequency characteristic of a frequency control device and a phase control device based on the detected value of a reproduction speed detection device on varying the reproduction speed from a first to a second reproduction speed, wherein the frequency control device and phase control device are included in a clock signal output device for outputting a clock synchronized with the reproduced signal.

A fifth optical disc device in accordance with the present invention switches off a focus control device based on either one signal of the outputs of a reflected light quantity detection device and a reproduced signal amplitude detection device and the output of a drive signal of a shift device for shifting a focusing device in the direction substantially perpendicular to the information-recording surface on a recording medium, or a combination signal of the plural outputs.

Hereinafter, the present invention will be explained more in detail.

A first optical disc device in accordance with the invention is a reproducing device for reproducing the information on a rotating recording medium, which comprises a focusing device for focusing and irradiating a light beam on the recording medium, a shift device for shifting the light beam focused on the recording medium by the focusing device across a track on the recording medium, a light detection device for receiving reflected light from the recording medium or transmitted light through the recording medium, a signal processing device for amplifying an output signal of the light detection device and placing a frequency band limit thereon, a clock signal output device for outputting a clock synchronized with the output of the signal processing device, and a reproducing device for reproducing the information from the signal based on the output of the signal processing device and the output clock of the clock signal output device. Thereby, one feature of the first optical system is that the characteristic of the signal processing device is varied according to the position of the light beam shifted by the shift device.

Further, another feature of the first optical disc device is that the amplifying factor and band-limited frequency of the signal processing device for amplifying the output signal of said light detection device and placing the frequency band limit thereon are varied.

Still a further feature of the first optical disc device is to rotate the recording medium to a constant number of rotations (at a constant angular velocity).

An even further feature of the first optical disc device is to rotate the recording medium at a constant linear velocity while varying the number of rotations at the inner circumference from that at the outer circumference so as to produce a constant reproduction speed with respect to the information on the recording medium.

A second optical disc device in accordance with the invention is a device for reproducing information on a rotating recording medium, which comprises a focusing device for focusing and irradiating a light beam on the recording medium, a shift device for shifting the light beam focused on the recording medium by the focusing device across a track on the recording medium, a light detection device for receiving reflected light from the recording medium or transmitted light through the recording medium, a signal processing device for amplifying the output signal of the light detection device and placing a frequency band limit thereon, a clock signal output device for outputting a clock synchronized with the output of the signal processing device, and a reproducing device for reproducing the information from the signal based on the output of the signal processing device and the output clock of the clock signal output device. One feature of the second optical disc device is to vary the characteristic of the clock signal output device according to the position of the light beam shifted by the shift device.

Another feature of the second optical disc device is that the clock signal output device comprises a variable oscillator for varying the output oscillation frequency thereof according to the output of a phase comparator device for comparing phases of an input signal and an output clock of the clock signal output device and a frequency divider for dividing the output of the variable oscillator.

A third optical disc device in accordance with the present invention comprises a rotation device for rotating a recording medium to a predetermined number rotations, a focusing device for focusing and irradiating a light beam on the recording medium, a first shift device for shifting the light beam focused on the recording medium across a track, a second shift device for shifting the focal point of the light beam focused by the focusing device in the direction substantially perpendicular to an information-recording surface on the recording medium, a light detection device for receiving reflected light from the recording medium, a focusing condition detection device for detecting the condition of focusing of the light beam irradiated on the information-recording surface based on an output signal of the light detection device, a focus control device for driving the second shift device based on an output signal of the focusing condition detection device so as to control the condition of focusing of the light beam on the information-recording surface to a predetermined condition, a track displacement detection device for detecting a positional displacement between the light beam on the recording medium and a track based on an output of the light detection device, a tracking control device for controlling the drive of the first shift device according to the output signal of the track displacement detection device so as to position the light beam on the recording medium on the track, a reproduction speed setting device for varying the reproduction speed according to the kind or recorded condition of information on the recording medium, and a reproduction speed detection device for measuring and detecting an actual reproduction speed. And, one feature of the third optical disc device is that, on varying the reproduction speed of the recording medium from a first reproduction speed to a second reproduction speed by the reproduction speed setting device, the gain or frequency characteristic of the focus control device/tracking control device is varied based on a detected value of the reproduction speed detection device.

Another feature of the third optical disc device is that, when audio information has been recorded, the reproduction speed setting device varies the rotational speed to a predetermined speed, and the gain or frequency characteristic of the focus control device/tracking control device is varied according to the rotational speed.

A fourth optical disc device in accordance with the present invention comprises a rotation device for rotating a recording medium to a predetermined number of rotations, a focusing device for focusing and irradiating a light beam on the recording medium, a light detection device for receiving reflected light from the recording medium or the transmitted light through the recording medium, a signal processing device for amplifying an output signal of the light detection device and placing a frequency band limit thereon, a phase comparator device for comparing a phase with that of an output signal of the signal processing device, a frequency control device for varying the frequency of the clock signal according to an output of the phase comparator device, a clock signal output device for outputting a clock synchronized with an output of the signal processing device, the clock signal output device including a clock control device comprising a phase control device for locking phases so as to keep a constant phase, a reproduction device for reproducing information from a signal based on the output of the signal processing device and an output clock of the clock signal output device, a reproduction speed setting device for setting and varying the reproduction speed according to the kind or recorded condition of the information on the recording medium, and a reproduction speed detection device for measuring and detecting an actual reproduction speed. And one feature of the fourth optical disc device is that, on varying the reproduction speed of the recording medium from a first reproduction speed to a second reproduction speed by the reproduction speed setting device, the gains or frequency characteristics of the frequency control device and the phase control device are varied based on the detected value of the reproduction speed detection device.

Another feature of the fourth optical disc device is that, when audio information has been recorded, the reproduction speed setting device varies the rotational speed to a predetermined speed, and the gain or frequency characteristic of the frequency control device/phase control device is varied according to the rotational speed.

A fifth optical disc device in accordance with the invention comprises a focusing device for focusing and irradiating a light beam on a recording medium, a first shift device for shifting the light beam focused on the recording medium across a track, a second shift device for shifting the focal point of the light beam focused by the focusing device in the direction substantially perpendicular to the information-recording surface on the recording medium, a light detection device for receiving reflected light from the recording medium, a focusing condition detection device for detecting a focusing condition of the light beam irradiated on the information-recording surface based on an output signal of the light detection device, a focus control device for driving the second shift device based on the output signal of the focusing condition detection device so as to control the focusing condition of the light beam on the information-recording surface to a predetermined condition, a track displacement detection device for detecting a positional displacement between the light beam on the recording medium and a track based on an output of the light detection device, a tracking control device for controlling the drive of the first shift device according to an output signal of the track displacement detection device so as to position the light beam on the recording medium on the track, a reflected-light quantity detection device for outputting a signal corresponding to a light quantity of the reflected light incident on the light detection device based on a signal of the light detection device, and a reproduced-signal amplitude detection device for detecting the reproduced signal based on the signal of the light detection device and for detecting the amplitude of the reproduced signal. And, one feature of the fifth optical disc device is that the device includes an out-of-detection and selection device for switching off the focus control device based on either one signal of the outputs of the reflected-light quantity detection device and the reproduced signal amplitude detection device and the output of a drive signal of the second shift device, or a combination signal of the plural outputs.

Another feature of the fifth optical disc device is that the signal selected by the out-of-focus detection and selection device is switched according to on/off of the tracking control device.

Further, another feature of the fifth optical disc device is that, on turning off the focus control device, the rotation device for rotating the recording medium is controlled to be switched so as to rotate the recording medium at a constant rate.

DESCRIPTION OF THE EMBODIMENT

At first, first and second embodiments will be explained with reference to FIGS. 1 and 2, and FIGS. 3 and 5.

Figure 7:
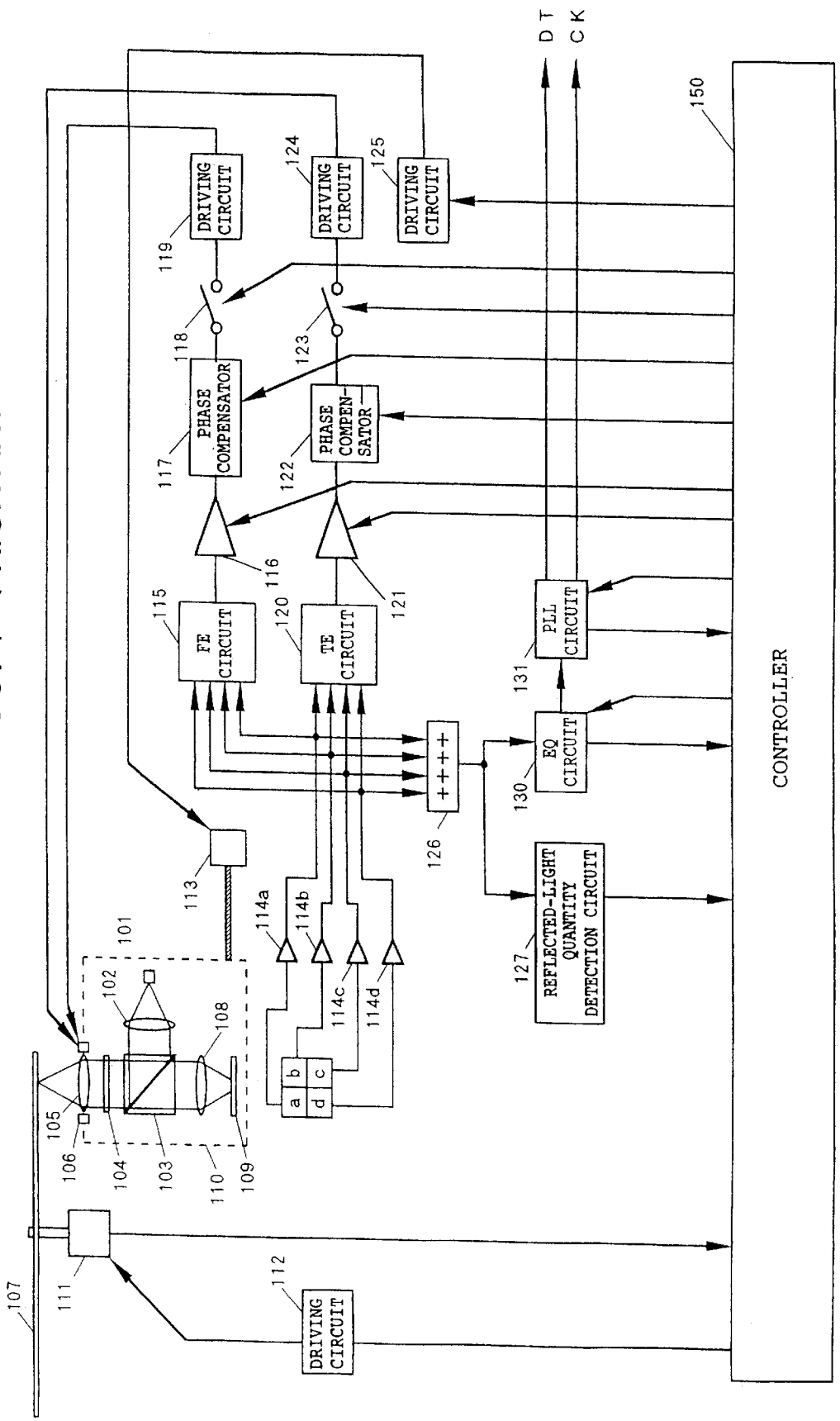
FIG. 7 is a block diagram of a conventional device.

The first and second embodiments are so configured as to change the settings of a control system and signal processing system according to a reproduction speed. Here, the same reference numbers as those used in FIG. 7 indicate the same and so the explanation will be omitted.

A motor 111 rotates a disk 107. The number of rotations of the disk is controlled based on the output clock of the PLL circuit 131 to provide a predetermined reproduction speed. Further, a focus control is performed to position the focal point of a light beam on the information-recording surface of the disk 107.

A tracking control is performed to position the focal point of a light beam on a track on the disk 107. Under such a condition, a controller 150 turns off a switch 123 and sends a signal to a driving circuit 125 for driving a shift means 113 so as to shift a head unit 110 to the position of a desired track.

Figure 1:
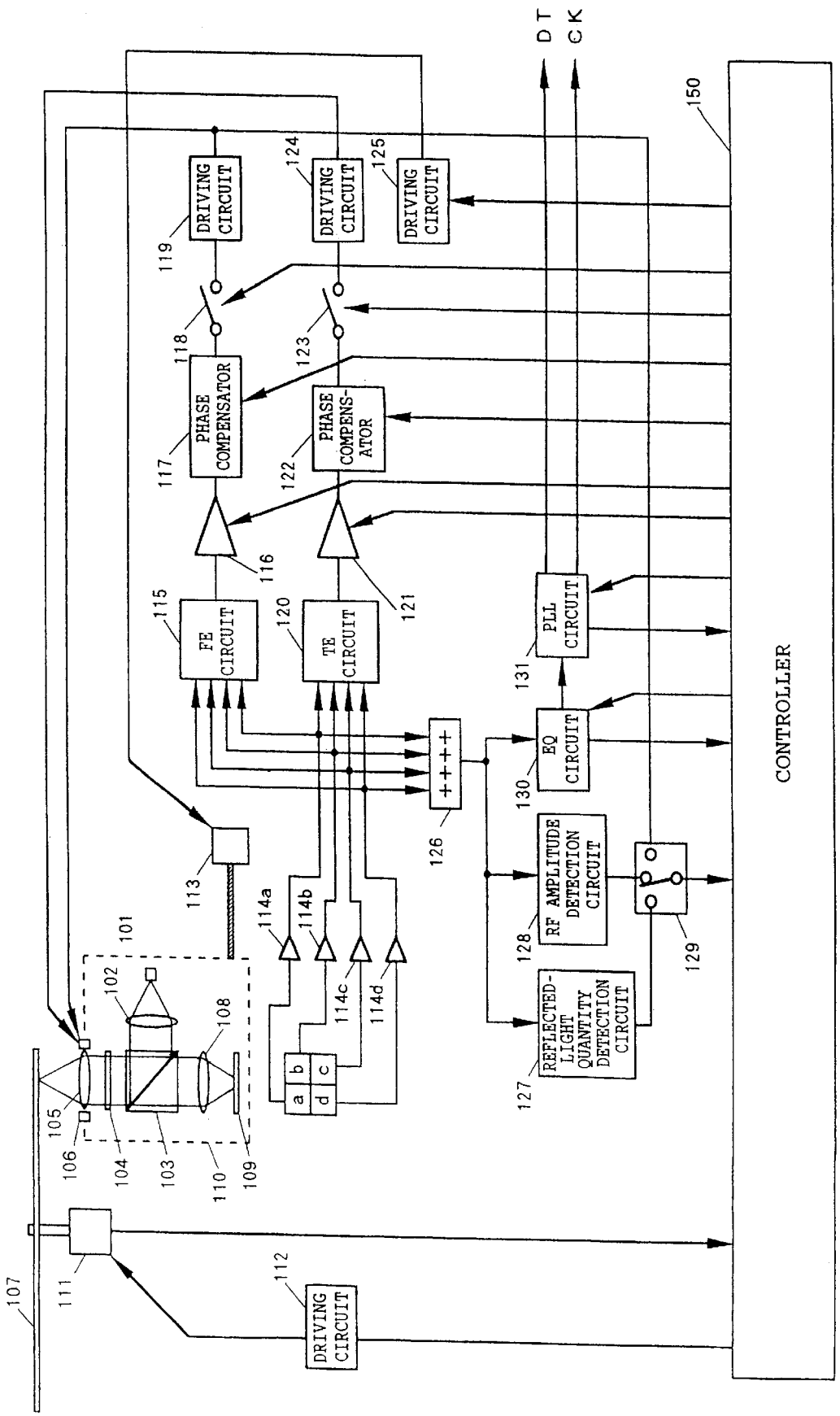
FIG. 1 is a block diagram of an embodiment of the present invention.
Figure 2:
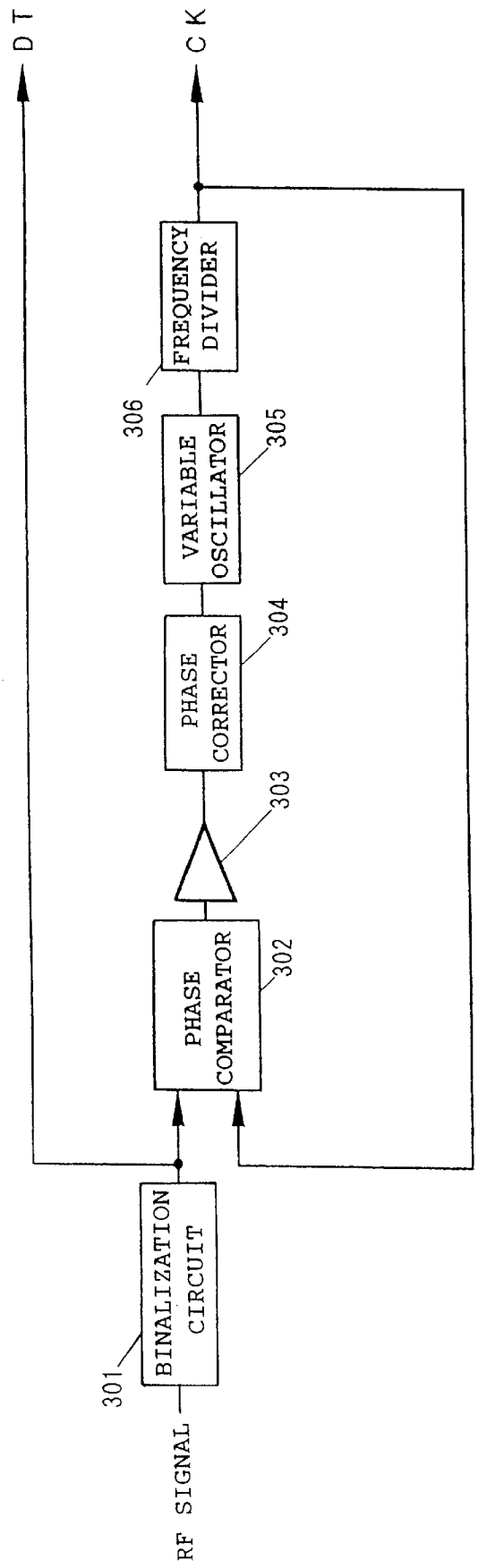
FIG. 2 is a block diagram of a PLL circuit in an embodiment of the invention.
Figure 3:
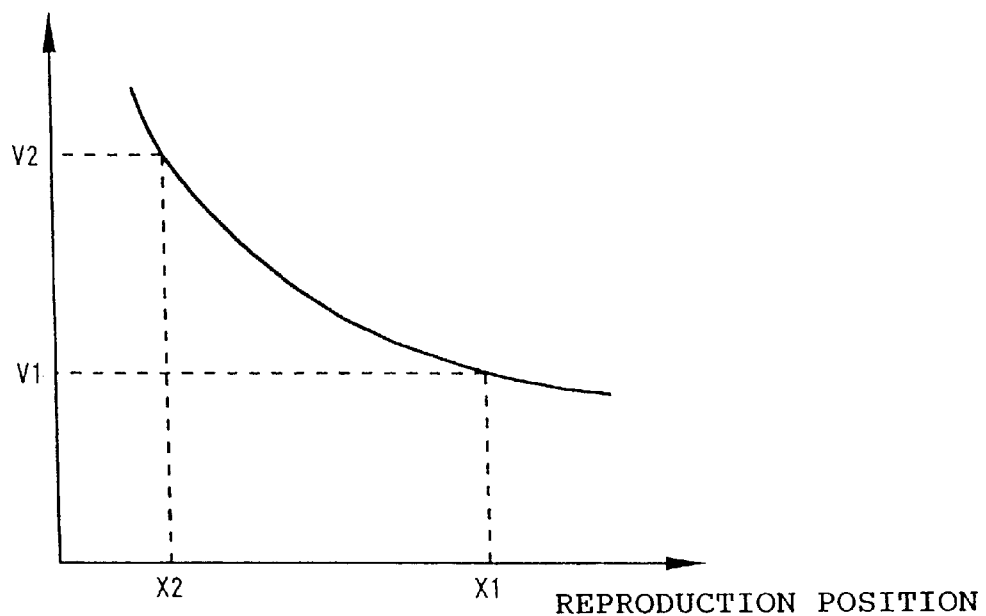
FIG. 3 is a plot of the number of rotations of a motor relative to a reproduction position in CLV reproduction according to an embodiment of the invention.

With reference to FIG. 3, the number of rotations of the motor 111 with respect to the radial position of the disc in the reproduction of information will be explained.

Figure 5:
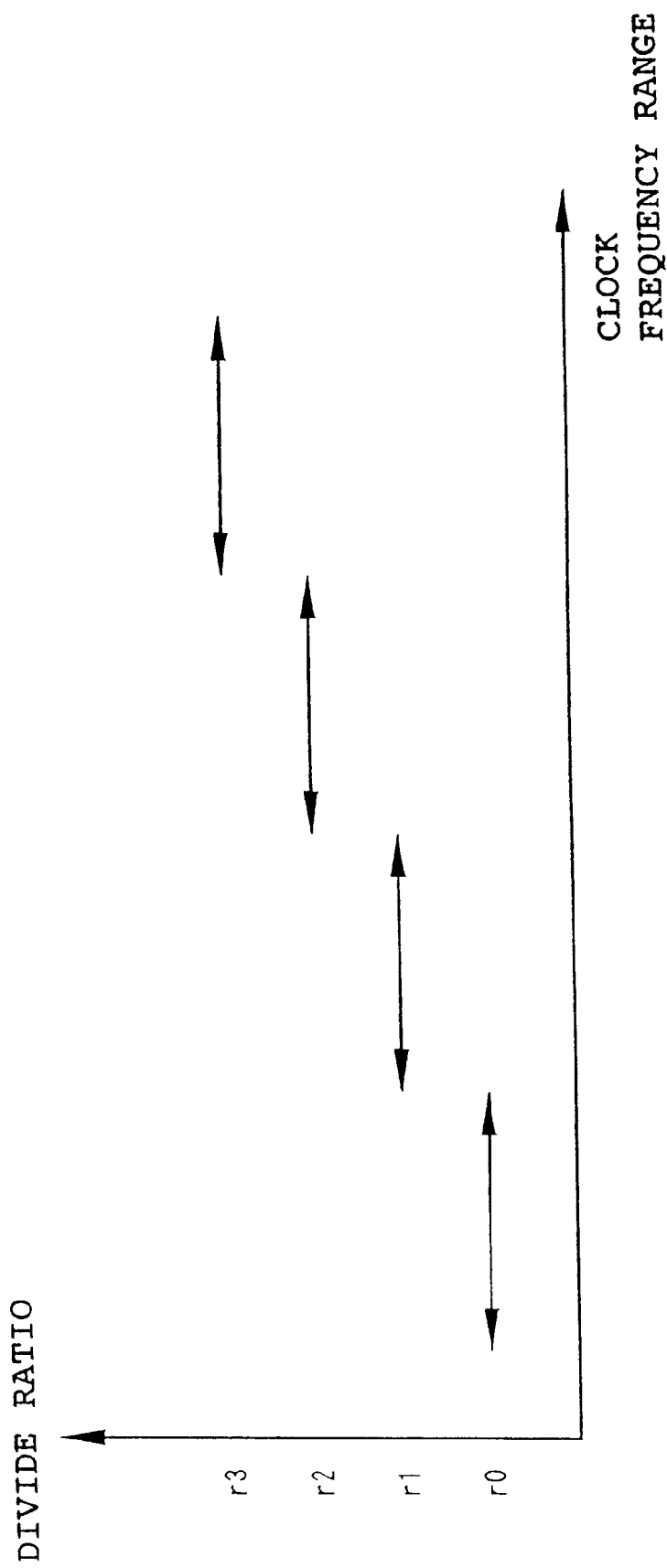
FIG. 5 is a plot of a frequency divide ratio in PLL relative to the range of clock frequency according to an embodiment of the invention.
Figure 6B:
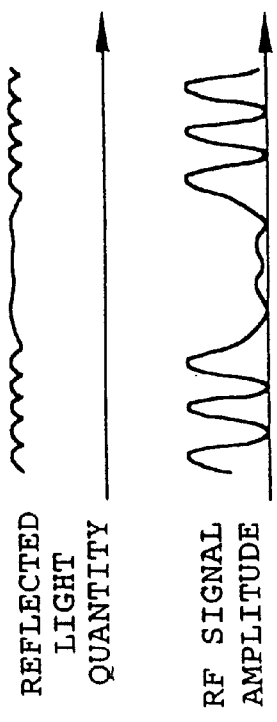
FIG. 6a, FIG. 6b, FIG. 6c and FIG. 6d are plots of reflected-light quantities/RF amplitudes on recorded and non-recorded portions on a disc, according to an embodiment of the invention.
Figure 6D:
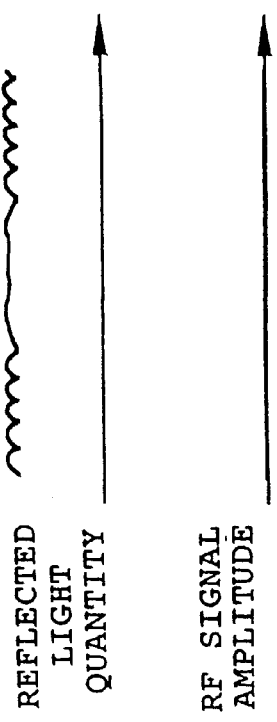
Figure 6A:
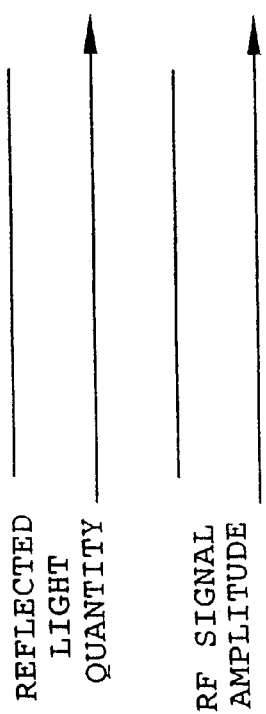
Figure 6C:
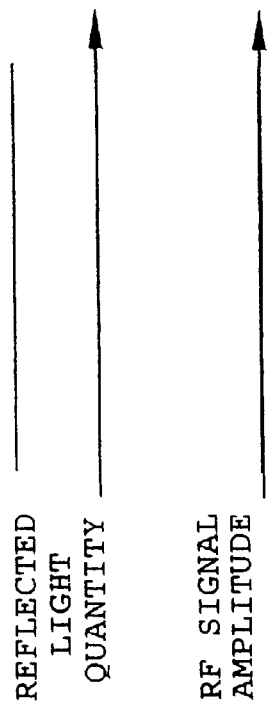

When the speed of reproduction is to be maintained constant, the number of rotations of the motor 111 is changed such that the relative velocity between the focal point of the light beam and a track, that is to say a linear velocity, can be maintained constant. However, when the head unit 110 shifts from a position X1 to a position X2 at a fast speed, the number of rotations of the motor 111 becomes different from the number of rotations V2 if the response of the motor 111 is slow. In this case, because the actual linear velocity differs from the prescribed velocity, the most suitable constant for the control system varies. For example, concerning the divide ratio of the PLL, if the linear velocity equals to the prescribed linear velocity, the ratio is set to r1 as shown in FIG. 5. However, because the actual linear velocity is different from the prescribed linear velocity, the lead clock frequency is beyond the confines of the divide ratio r1 and so reproduction becomes impossible.

For the problem described above, the controller 150 determines the number of rotations of the motor 111 and calculates a reproduction speed by using the obtained number of rotations and the now-located radial reproduction position. The controller 150 sends signals corresponding to the reproduction speed to the variable amplifiers 116 and 121, PLL circuit 131 and equalizer circuit 130 such that the settings of amplification factor, frequency characteristics and divide ratio may be adjusted to achieve the characteristics responsive to the radial position of the disc. Then, the controller 150 turns on the switch 123 to start the tracking control.

This reproduction method can provide stable reproduction of signals, even if the motor 111 is rotating at the number of rotations which is different from a predetermined number.

In the embodiment described above, the reproduction speed is calculated from the number of rotations of the motor 111 and the radial position of the disc. However, a similar result can be obtained from computation of the reproduction speed by using comparison of the length of the longest pattern of RF signals and the prescribed values.

Figure 4:
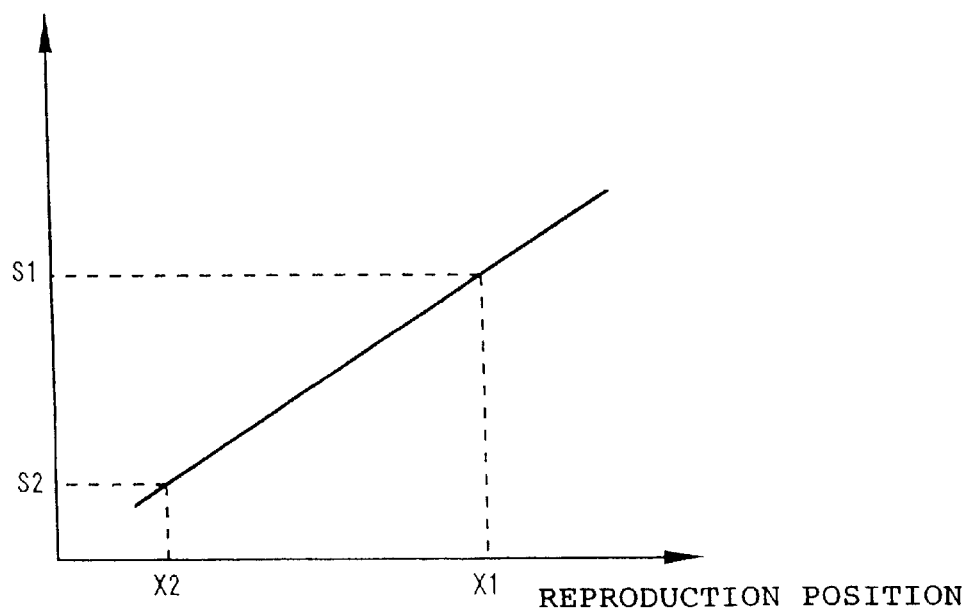
FIG. 4 is a plot of a reproduction speed relative to a reproduction position in CAV reproduction according to an embodiment of the invention.

According to the embodiment described above, the motor 111 is controlled such that a predetermined reproduction speed is obtained. This method is also applicable to the case where the number of rotations of the motor 111 is kept constant. This application will be explained with reference to FIGS. 1 and 4. FIG. 4 shows a plot of a reproduction speed relative to a reproduction position in the CAV reproduction according to an embodiment of the invention.

The motor 111 rotates the disc 107 and the number of rotations of the disc 107 is controlled to be constant. A focus control is performed so as to position the focal point of a light beam on the information-recording surface of the disc 107. Further, a tracking control is performed so as to position the focal point of the light beam on a track on the disk 107. Under such a condition, the controller 150 turns off the switch 123 and sends a signal to the driving circuit 125 for driving a shift means 113 so as to shift the head unit 110 to the position of a target track.

The reproduction speed relative to a radial position at which reproduction is performed will be explained with reference to FIG. 4. When the number of rotations of the motor is kept constant, the reproduction speed varies depending on the radial position at which reproduction is performed. For example, in the case of shifting the head unit 110 from the position X1 to the position X2, the reproduction speed changes from S1 to S2.

For the problem described above, the controller 150 calculates the reproduction speed using the now-located radial position under reproduction. And, the controller 150 sends signals corresponding to the reproduction speed to the variable amplifiers 116 and 121, PLL circuit 131 and equalizer circuit 130, and adjusts the settings of amplification factor, frequency characteristic and divide ratio such that the characteristics responsive to the radial position of the disc may be accomplished. The controller 150 turns on the switch 123 and starts the tracking control.

The configuration described above provides a stable signal reproduction regardless of radial positions at which reproduction of information is performed.

Then, a third and fourth embodiments will be explained. The third and fourth embodiments are configured so that, on varying the reproduction speed, the settings of the control system and signal processing system may be varied according to the reproduction speed. This will be explained with reference to FIG. 1. The motor 111 rotates the disc 107. The focus control is performed so as to position the focal point of the light beam on the information-recording surface of the disc 107. And, the tracking control is performed so as to position the focal point of the light beam on a track on the disc 107. Under such a condition, the controller 150 sends signals to the driving circuit 112 for the varying of the reproduction speed and varies the number of rotations of the motor 111.

However, when the response of the motor 111 is slow, the predetermined number of rotations is not attained immediately. For this problem, the controller 150 reads the number of rotations of the motor 111 and calculates a reproduction speed from the radial position of the disc at which reproduction is performed and from said determined number of rotations. Then, the controller 150 sends signals responsive to the reproduction speed to the variable amplifiers 116 and 121, PLL circuit 131 and equalizer circuit 130 for adjusting the settings of amplification factors, frequency characteristic and divide ratio so as to accomplish the characteristics responsive to the radial position of the disc.

This method can provide a quick and stable reproduction of signals, even if the motor 111 is slow in response and takes much time until the predetermined number of rotations is attained.

Then, a fifth embodiment will be explained.

The fifth embodiment is configured so as to switch the detection signals for detecting a deviated operation from focus control according to the condition of tracking control. The fifth embodiment will be explained with reference to FIG. 1 and FIG. 6a to FIG. 6d.

FIG. 6a to FIG. 6d show the reflected-light quantities/RF amplitudes on recorded and non-recorded portions according to the embodiment of the invention.

The motor 111 rotates the disc 107 and the number of rotations of the disc 107 is controlled so as to maintain the reproduction speed constant based on the output clock of the PLL circuit 131. The controller 150 turns on the switch 118 and performs the focus control so that the focal point of the light beam may be positioned on the information-recording surface of the disc 107. Further, the controller 150 turns on the switch 123 and performs the tracking control so that the focal point of the light beam may be positioned on the track on the disc 107.

Under this condition, the controller 150 switches the switch 129 for detecting a deviated operation from the focus control based on the output level of the RF amplitude measuring equipment 128. When the output level of the RF amplitude measuring equipment 128 is kept below the predetermined level over a predetermined time, the controller 150 identifies the occurrence of a deviated operation from the focus control, and the controller 150 switches off the switch 118 to turn off the focus control operation and sends signals to the driving circuit 112 to rotate the motor 111 at a constant rate.

Further, in the case where the tracking control operation is turned off by switching off the switch 123 in order to perform a search operation or the like, the controller 150 switches the switch 129 for detecting a deviated operation from the focus control based on the output level of the reflected-light quantity detector 127. When the output level of the reflected-light quantity detector 127 is maintained below the predetermined level over the predetermined time, the controller 150 identifies the occurrence of the deviated operation from the focus control, and the controller 150 switches off the switch 118 to turn off the focus control operation and sends signals to the driving circuit 112 to rotate the motor 111 at a constant rate.

The operation described above will be explained with reference to FIG. 6a to FIG. 6d.

FIG. 6a to FIG. 6d show the outputs of the reflected-light quantity detector 127 and RF signal amplitude measuring equipment 128 for recorded and non-recorded portions under the conditions where the tracking control is turned on and off. When the tracking control is on, recorded portions or non-recorded portions can be identified by the output of the RF signal amplitude measuring equipment 128. On the other hand, when the tracking control is off, the focal point of the light beam crosses the track on the disc 107 due to decentering of the disc and others, so that the output level of the RF signal amplitude measuring equipment 128 varies even in the recorded portions. Therefore, the condition for identifying the deviated operation from the focus control is satisfied in portions where the velocity of crossing is slow, so that the focus control operation is switched off. However, this problem described above can be avoided by detecting the deviated operation from the focus control based on the level of the reflected-light quantity detector 127, when the tracking control is off.

Further, when the operation of focus control is disturbed by shocks applied to optical disc devices and flaws on discs 107, the systems get out of the range of focus control. In such cases, because the reflected light is not focused on the light detector 109, the outputs of the reflected-light quantity detector 127 and the RF signal amplitude measuring equipment 128 become small, and the an operation out of focus control is reliably detected.

For non-recorded portions in CD-R and CD-RW, the device may be preferably configured such that an operation out of focus control is detected by the RF amplitude when the tracking control is on, as explained above, and by the reflected-light quantity signal when the tracking control is off. Such configuration makes it possible to quickly detect the operation out of focus control when the tracking is on in non-recorded portions. Further, in the case of discs with significantly low reflectivity such as CD-RW, the devise may be preferably configured such that defocusing is detected via the switch 129 when the level of the driving signal for the focusing actuator is beyond a certain level. Such configuration makes it possible to prevent detection errors caused by noise or improper detection due to adhesion of dust and others.

As described above, according to the first, second, third and fourth embodiments of the invention, the settings of control system and signal processing system are varied according to an actual reproduction speed, so that a stable reproduction of signals can be realized.

Further, according to the fifth embodiment, a high precision detection of the operation out of focus control can be performed in both recorded portions and non-recorded portions of CD, CD-R or CD-RW, thereby preventing collision of discs and damages to actuators.

What is claimed is:

1. An optical disc device comprising;
   a rotation means for rotating a recording medium to a predetermined number of rotations,
   a focusing means for focusing and irradiating a light beam on the recording medium, a first shift means for shifting a light beam focused on the recording medium across a track, a second shift means for shifting the focal point of the light beam focused by said focusing means in a direction substantially perpendicular to an information-recording surface on the recording medium, a light detection means for receiving reflected light from the recording medium, a focusing condition detection means for detecting the focusing condition of the light beam irradiated on the information-recording surface based on an output signal of said light detection means, a focus control means for driving said second shift means based on an output signal of said focusing condition detection means so as to control the focusing condition of said light beam on the information-recording surface to a predetermined condition, a track displacement detection means for detecting a positional displacement between the light beam on the recording medium and a track based on an output of said light detection means, a tracking control means for controlling the drive of said first shift means according to an output signal of said track displacement detection means so as to position the light beam on the recording medium on the track, a reproduction speed setting means for varying the reproduction speed according to the kind or recorded condition of information on the recording medium, and a reproduction speed detection means for measuring and detecting an actual reproduction speed, whereby on varying the reproduction speed of the recording medium from a first to a second reproduction speed by said reproduction speed setting means, the gain or frequency characteristic of said focus control means or said tracking control means is varied based on a detected value by said reproduction speed detection means, at least until an actual reproduction speed has shifted to the second reproduction speed, so as to provide a stable reproduction operation during a transition period of the actual reproduction speed from the first to the second reproduction speed.

2. An optical disc device comprising;

a rotation means for rotating a recording medium to a predetermined number of rotations, a focusing means for focusing and irradiating a light beam on the recording medium, a light detecting means for receiving reflected light from the recording medium, a signal processing means for amplifying an output signal of said light detection means and placing a frequency band limit thereon, a phase comparator means for comparing a phase with that of an output signal of said signal processing means, a frequency control means for varying the frequency of said clock signal according to an output of said phase comparator means, a clock signal output means for outputting a clock synchronized with an output of said signal processing means, said clock signal output means including a clock control means comprising a phase control means for locking phases so as to keep a constant phase, a reproduction means for reproducing information from a signal based on the output of said signal processing means and an output clock of said clock signal output means, a reproduction speed setting means for setting and varying the reproduction speed according to the kind or recorded condition of the information on the recording medium, and a reproduction speed detection means for measuring and detecting an actual reproduction speed, whereby on varying the reproduction speed of the recording medium from a first to a second reproduction speed by said reproduction speed setting means, the gains or frequency characteristics of said frequency control means and said phase control means are varied based on the detected value by said reproduction speed detection means, at least until an actual reproduction speed has shifted to the second reproduction speed, so as to provide a stable reproduction operation during a transition period of the actual reproduction speed from the first to the second reproduction speed.

3. An optical disc device comprising;

a focusing means for focusing and irradiating a light beam on a recording medium, a first shift means for shifting the light beam focused on the recording medium across a track, a second shift means for shifting the focal point of the light beam focused by said focusing means in the direction substantially perpendicular to an information-recording surface on the recording medium, a light detection means for receiving reflected light from the recording medium, a focusing condition detection means for detecting a focusing condition of the light beam irradiated on the information-recording surface based on an output signal of said light detection means, a focus control means for driving said second shift means based on an output signal of said focusing condition detection means so as to control the focusing condition of said light beam on the information-recording surface to a predetermined condition, a track displacement detection means for detecting a positional displacement between the light beam on the recording medium and a track based on an output of said light detection means, a tracking control means for controlling the drive of said first shift means according to an output signal of said track displacement detection means so as to position the light beam on the recording medium on the track, a reflected-light quantity detection means for outputting a signal corresponding to a light quantity of the reflected light incident on said light detection means based on a signal of said light detection means, a reproduced-signal amplitude detection means for detecting a reproduced signal based on the signal of said light detection means and for detecting the amplitude of said reproduced signal, and a controller including an out-of-focus detection and selection means for switching off said focus control means based on one signal of the outputs of said reflected-light quantity detection means and reproduced signal amplitude detection means and the output of a drive signal of said second shift means, wherein the output of said reproduced signal amplitude detection means is not used by said out-of-focus operation detection and selection means at least when said tracking control means is off.

* * * * *